(12) United States Patent
Byrne et al.

(10) Patent No.: US 12,537,353 B2
(45) Date of Patent: Jan. 27, 2026

(54) ELECTRICAL POWER DISTRIBUTION SYSTEM

(71) Applicants: Norman R. Byrne, Ada, MI (US); Gerald N. Vander Till, Grandville, MI (US)

(72) Inventors: Norman R. Byrne, Ada, MI (US); Gerald N. Vander Till, Grandville, MI (US)

(73) Assignee: Norman R. Byrne, Ada, MI (US)

(*) Notice: Subject to any disclaimer, the term of this patent is extended or adjusted under 35 U.S.C. 154(b) by 0 days.

(21) Appl. No.: 18/208,749

(22) Filed: Jun. 12, 2023

(65) Prior Publication Data

US 2023/0327384 A1    Oct. 12, 2023

Related U.S. Application Data

(63) Continuation of application No. 16/895,730, filed on Jun. 8, 2020, now Pat. No. 11,677,199.

(60) Provisional application No. 62/858,695, filed on Jun. 7, 2019.

(51) Int. Cl.
| | | |
|---|---|---|
| H01R 25/00 | (2006.01) |
| H01B 7/06 | (2006.01) |
| H01R 13/72 | (2006.01) |
| H01R 13/73 | (2006.01) |
| H02G 5/02 | (2006.01) |
| H02J 4/00 | (2006.01) |

(52) U.S. Cl.
CPC ............. *H01R 25/003* (2013.01); *H01B 7/06* (2013.01); *H01R 13/72* (2013.01); *H01R 13/73* (2013.01); *H02G 5/02* (2013.01); *H02J 4/00* (2013.01)

(58) Field of Classification Search
CPC ...... H01R 25/003; H01R 13/72; H01R 13/73; H01R 13/5825; H01B 7/06; H02G 5/02; H02J 4/00
See application file for complete search history.

(56) References Cited

U.S. PATENT DOCUMENTS

| | | |
|---|---|---|
| 1,333,003 A | 3/1920 | Titus |
| 2,094,681 A | 10/1937 | Sears |
| 2,157,527 A | 5/1939 | Clarke et al. |
| 3,049,688 A | 8/1962 | Sinopoli |
| 3,297,886 A | 1/1967 | Danner |
| 3,585,569 A | 6/1971 | Moran |
| 3,598,900 A | 8/1971 | Drake |
| 3,984,622 A | 10/1976 | Ross |
| 4,099,824 A | 7/1978 | Schoppelrey |
| D256,581 S | 8/1980 | Bartin |
| 4,399,371 A | 8/1983 | Ziff et al. |

(Continued)

*Primary Examiner* — Daniel Kessie
*Assistant Examiner* — Brian K Baxter
(74) *Attorney, Agent, or Firm* — Gardner, Linn, Burkhart & Ondersma LLP

(57) ABSTRACT

An electrical power or data system includes an electrical power or data supply cord and an intermediate power or data cord, a first electrical power or data outlet receptacle disposed between the supply cord and the intermediate cord, and a second electrical power or data outlet receptacle at a distal end of the intermediate cord. The first electrical power or data outlet is positionable below a work surface, while the second electrical power or data outlet is mountable to the work surface. At least one of the electrical cords may include a self-retracting cord section.

19 Claims, 8 Drawing Sheets

(56) References Cited

U.S. PATENT DOCUMENTS

| | | |
|---|---|---|
| 4,434,377 A | 2/1984 | Shima et al. |
| 4,607,906 A * | 8/1986 | Munroe ............... H01R 13/743 |
| | | 439/94 |
| 4,667,460 A | 5/1987 | Kramer |
| 4,717,350 A * | 1/1988 | Lax ..................... H01R 25/003 |
| | | 439/502 |
| 5,234,360 A | 8/1993 | Kramer, Jr. |
| 5,236,374 A | 8/1993 | Leonard et al. |
| 5,238,424 A | 8/1993 | Vindum |
| 5,275,574 A | 1/1994 | Schlothauer et al. |
| 5,283,392 A | 2/1994 | Ooshima et al. |
| 5,285,349 A * | 2/1994 | Zander ..................... H02B 1/26 |
| | | 361/728 |
| 5,414,212 A | 5/1995 | Clouet et al. |
| 5,425,659 A | 6/1995 | Banks |
| 5,518,214 A | 5/1996 | Spencer |
| 5,547,399 A | 8/1996 | Naghi et al. |
| 5,575,668 A | 11/1996 | Timmerman |
| 5,606,150 A | 2/1997 | Radliff et al. |
| 5,616,968 A | 4/1997 | Fujii et al. |
| 5,676,563 A | 10/1997 | Kondo et al. |
| 5,902,148 A | 5/1999 | O'Rourke |
| D413,571 S | 9/1999 | Glass |
| 5,957,714 A | 9/1999 | Johnson et al. |
| 6,004,157 A | 12/1999 | Glass |
| 6,028,267 A | 2/2000 | Byrne |
| 6,077,109 A * | 6/2000 | Prazoff .................. H01R 13/72 |
| | | 439/501 |
| 6,133,845 A | 10/2000 | Toms et al. |
| 6,179,381 B1 | 1/2001 | Gevaert |
| 6,207,894 B1 | 3/2001 | Reiker |
| 6,257,923 B1 | 7/2001 | Stone et al. |
| 6,259,027 B1 | 7/2001 | Watanabe |
| 6,281,434 B1 | 8/2001 | Gretz |
| 6,281,439 B1 | 8/2001 | Reiker |
| 6,290,518 B1 | 9/2001 | Byrne |
| 6,362,987 B1 | 3/2002 | Yurek et al. |
| 6,379,182 B1 | 4/2002 | Byrne |
| 6,486,407 B1 | 11/2002 | Hawker et al. |
| 6,573,617 B2 | 6/2003 | Jones et al. |
| 6,746,273 B1 | 6/2004 | Liu et al. |
| 6,767,255 B1 | 7/2004 | Croswell |
| 6,786,765 B2 | 9/2004 | Bauermeister et al. |
| 6,793,523 B1 * | 9/2004 | Wei ........................ H01R 13/72 |
| | | 439/501 |
| 6,805,579 B2 | 10/2004 | Marchand et al. |
| 6,951,468 B1 | 10/2005 | Greco |
| 7,057,108 B1 | 6/2006 | Sodemann et al. |
| 7,066,616 B2 | 6/2006 | Howell |
| 7,140,910 B1 | 11/2006 | Liao |
| 7,210,960 B2 * | 5/2007 | Mak ..................... H01R 25/003 |
| | | 439/505 |
| 7,229,302 B1 | 6/2007 | Lai |
| 7,282,645 B2 | 10/2007 | Locke |
| 7,285,021 B2 | 10/2007 | Bell et al. |
| D579,873 S | 11/2008 | Gershfeld |
| 7,467,967 B2 | 12/2008 | Kuo |
| 7,511,226 B2 | 3/2009 | Fahey |
| 7,537,485 B2 | 5/2009 | Bell et al. |
| 7,591,673 B2 | 9/2009 | Chan et al. |
| D604,253 S | 11/2009 | Andre et al. |
| 7,614,911 B2 | 11/2009 | Hsieh et al. |
| 7,624,503 B2 | 12/2009 | Fukuda |
| 7,642,671 B2 | 1/2010 | Mahaffey |
| 7,663,866 B2 | 2/2010 | Lee et al. |
| D613,248 S | 4/2010 | Wu |
| 7,751,206 B2 | 7/2010 | Kosacek et al. |
| 7,874,856 B1 | 1/2011 | Schreifer et al. |
| D632,258 S | 2/2011 | Sumida |
| 7,878,845 B2 | 2/2011 | Byrne |
| 7,932,480 B2 | 4/2011 | Gu et al. |
| 8,003,888 B2 | 8/2011 | Owen, Sr. |
| 8,004,115 B2 | 8/2011 | Chapel et al. |
| 8,029,307 B2 | 10/2011 | O'Rourke |
| 8,116,940 B2 | 2/2012 | Keller |
| 8,174,147 B2 * | 5/2012 | Fleisig ................... H01R 13/72 |
| | | 439/654 |
| 8,235,746 B2 | 8/2012 | He |
| 8,350,406 B2 | 1/2013 | Byrne et al. |
| 8,464,982 B2 | 6/2013 | Raybell et al. |
| 8,574,010 B2 | 11/2013 | Wu |
| 8,604,342 B2 | 12/2013 | Solon |
| 8,608,505 B2 | 12/2013 | Mantay et al. |
| 8,653,365 B1 | 2/2014 | Mixon |
| 8,680,709 B2 | 3/2014 | Byrne et al. |
| 8,790,131 B1 * | 7/2014 | Black ...................... H02G 3/123 |
| | | 439/142 |
| D740,229 S | 10/2015 | Page et al. |
| 9,166,308 B2 | 10/2015 | Byrne |
| 9,531,145 B2 | 12/2016 | Byrne |
| 9,614,336 B2 * | 4/2017 | Los ........................ H01R 13/44 |
| 9,893,482 B2 | 2/2018 | Byrne et al. |
| D840,347 S | 2/2019 | Byrne et al. |
| D848,371 S | 5/2019 | Byrne et al. |
| D856,937 S | 8/2019 | Rupert |
| D887,363 S | 6/2020 | Byrne et al. |
| D911,975 S | 3/2021 | Maranto |
| D933,611 S | 10/2021 | Maranto |
| 11,677,199 B2 | 6/2023 | Byrne et al. |
| 2002/0189841 A1 | 12/2002 | Patterson |
| 2002/0195523 A1 | 12/2002 | Cawley |
| 2003/0168236 A1 * | 9/2003 | Conrad ................... H01R 13/72 |
| | | 174/53 |
| 2004/0050573 A1 | 3/2004 | Lin et al. |
| 2004/0182170 A1 | 9/2004 | Harju |
| 2004/0256135 A1 | 12/2004 | Liu |
| 2005/0011657 A1 | 1/2005 | Johnston et al. |
| 2005/0073835 A1 * | 4/2005 | Kett ....................... F21V 3/023 |
| | | 362/154 |
| 2006/0019532 A1 | 1/2006 | Kiss, Jr. |
| 2006/0274484 A1 * | 12/2006 | Mori ..................... H01R 25/003 |
| | | 361/601 |
| 2007/0270025 A1 * | 11/2007 | Mabry ................. H01R 25/003 |
| | | 439/470 |
| 2008/0012423 A1 | 1/2008 | Mimran |
| 2008/0140565 A1 | 6/2008 | DeBenedetti et al. |
| 2008/0196936 A1 | 8/2008 | Yamamoto et al. |
| 2008/0259533 A1 * | 10/2008 | Ramirez ................ H02H 3/083 |
| | | 361/63 |
| 2009/0053926 A1 | 2/2009 | Johnson et al. |
| 2009/0104811 A1 | 4/2009 | Sumida |
| 2009/0195970 A1 * | 8/2009 | Lee ........................ H01R 13/713 |
| | | 361/601 |
| 2009/0314515 A1 * | 12/2009 | Bevirt ........................ H01B 7/40 |
| | | 174/110 R |
| 2010/0090851 A1 | 4/2010 | Hauser |
| 2010/0139733 A1 | 6/2010 | Jonczyk et al. |
| 2011/0130031 A1 * | 6/2011 | Kartes .................. H01R 25/003 |
| | | 439/501 |
| 2012/0028488 A1 | 2/2012 | Puschnigg et al. |
| 2012/0295473 A1 | 11/2012 | Chen |
| 2013/0102186 A1 * | 4/2013 | Fu .......................... H01R 13/72 |
| | | 439/501 |
| 2013/0241731 A1 * | 9/2013 | Fawcett ............. G08B 13/1445 |
| | | 340/568.2 |
| 2013/0244463 A1 | 9/2013 | Talavasek et al. |
| 2013/0244476 A1 | 9/2013 | Symons |
| 2014/0041935 A1 | 2/2014 | Solon |
| 2014/0076628 A1 | 3/2014 | McGrath et al. |
| 2014/0220813 A1 * | 8/2014 | Nguyen ................... H01R 43/26 |
| | | 439/445 |
| 2014/0256166 A1 * | 9/2014 | Ramos ................ H01R 13/5205 |
| | | 439/271 |
| 2014/0355231 A1 * | 12/2014 | Byrne ...................... H02G 3/12 |
| | | 361/756 |
| 2015/0001937 A1 * | 1/2015 | Wang ....................... H02J 3/00 |
| | | 307/52 |
| 2015/0007937 A1 | 1/2015 | Wang |
| 2016/0181750 A1 * | 6/2016 | Trinh .................... H01R 13/717 |
| | | 200/51 R |
| 2018/0191113 A1 * | 7/2018 | Byrne .................. H01R 13/6666 |
| 2018/0287322 A1 * | 10/2018 | Hayes ...................... A47B 9/00 |

(56) References Cited

U.S. PATENT DOCUMENTS

| | | | | |
|---|---|---|---|---|
| 2019/0027330 A1* | 1/2019 | Coon | .................. | H05B 47/10 |
| 2019/0229511 A1* | 7/2019 | Byrne | .................. | F21V 23/06 |
| 2019/0319413 A1* | 10/2019 | Bhakta | .................. | H01R 24/78 |
| 2021/0367387 A1* | 11/2021 | Li | .................. | H01R 13/40 |
| 2022/0294233 A1* | 9/2022 | Bonilla | .................. | H02J 50/10 |

* cited by examiner

ELECTRICAL POWER DISTRIBUTION SYSTEM

CROSS REFERENCE TO RELATED APPLICATION

The present application is a continuation of U.S. patent application Ser. No. 16/895,730, filed Jun. 8, 2020, now U.S. Pat. No. 11,677,199, issued Jun. 13, 2023, which claims the priority of U.S. provisional application Ser. No. 62/858,695, filed Jun. 7, 2019, both of which are hereby incorporated herein by reference in their entireties.

FIELD OF THE INVENTION

The present invention relates to electrical power and data distribution systems, including furniture-mountable systems, for use in a work area.

BACKGROUND OF THE INVENTION

Electrical power and data units or outlets are commonly installed along furniture articles such as tables, desks, and chairs, particularly in work areas. In some cases it is desirable to install electrical power and data units or outlets to a work surface that raises and lowers, such as along a height-adjustable table or desk. In other applications, it may be sufficient to simply route a power or data cord along wall or floor surfaces and furniture surfaces in a desired area, without securing the cord or its outlet(s) to the other surfaces.

SUMMARY OF THE INVENTION

The present invention provides an electrical power or data distribution system with two or more electrical power or data units spaced apart by flexible power or data cords, for routing through a work area and permitting at least limited movements of the power or data units (or furniture articles to which they are attached) relative to one another and relative to a power or data supply such as a wall outlet. The electrical power or data distribution system can be used to supply power to a first remote location with a first power unit, and also to a second remote location that is different from the first remote location, using a second power unit. A self-retracting cord section such as an elastic coiled portion may be provided in any of the power or data cords, such as to take up slack between power or data units. Brackets may be provided for securing the power or data units to furniture articles or the like.

According to one form of the present invention, an electrical power or data system includes a flexible electrical supply cord, a pass-through electrical outlet unit, a flexible intermediate electrical cord, an end electrical outlet unit, and a bracket for coupling the end unit to a work surface. The flexible electrical supply cord has an input end portion and an opposite output end portion that is coupled to the pass-through electrical outlet unit. The pass-through electrical outlet unit includes a first plurality of electrical outlets and is configured for positioning below a work surface, such as along a floor surface or suspended from the intermediate cord. The intermediate electrical cord has an input end portion at the pass-through electrical outlet unit, and an opposite output end portion that connects to the end electrical outlet unit, which includes end a second plurality of electrical outlets.

In one aspect, the pass-through electrical outlet unit is configured to rest upon a floor surface below the work surface.

In another aspect, the pass-through electrical outlet is configured to be suspended below the work surface by the flexible intermediate electrical cord.

In yet another aspect, the pass-through electrical outlet includes a first strain relief for engaging the output end portion of the electrical supply cord, and a second strain relief for engaging the input end portions of the flexible intermediate electrical cord.

Optionally, the pass-through electrical outlet includes a plurality of electrical bus bars having respective opposite ends that are mechanically and electrically coupled to respective electrical conductors of the electrical supply cord, and to respective electrical conductors of the flexible intermediate electrical cord. Optionally, each of the electrical bus bars has a plurality of electrical terminals in spaced arrangement.

In a further aspect, at least one of the electrical supply cord and the intermediate electrical cord comprises a self-retracting cord section.

In a still further aspect, at least one of the pass-through electrical outlet unit and the end electrical outlet unit includes both a high voltage AC power outlet and a low voltage DC power outlet.

In yet another aspect, the input end portion of the electrical supply cord is fitted with a high voltage AC power plug, a low voltage DC power plug, or an electronic data signal plug.

Therefore, the electrical power or data distribution system of the present invention provides access to electrical power or electronic data at different locations separated by flexible cords, which allows for one power or data outlet unit to be positioned for convenience access along a work surface, and for another outlet unit to be positioned away from the work surface, where it may be more suitably located for less frequent access. One or more self-retracting cord sections may be used to limit or prevent excessive slack in the cords.

These and other objects, advantages, purposes and features of the present invention will become apparent upon review of the following specification in conjunction with the drawings.

DESCRIPTION OF THE PREFERRED EMBODIMENTS

Figure 1:
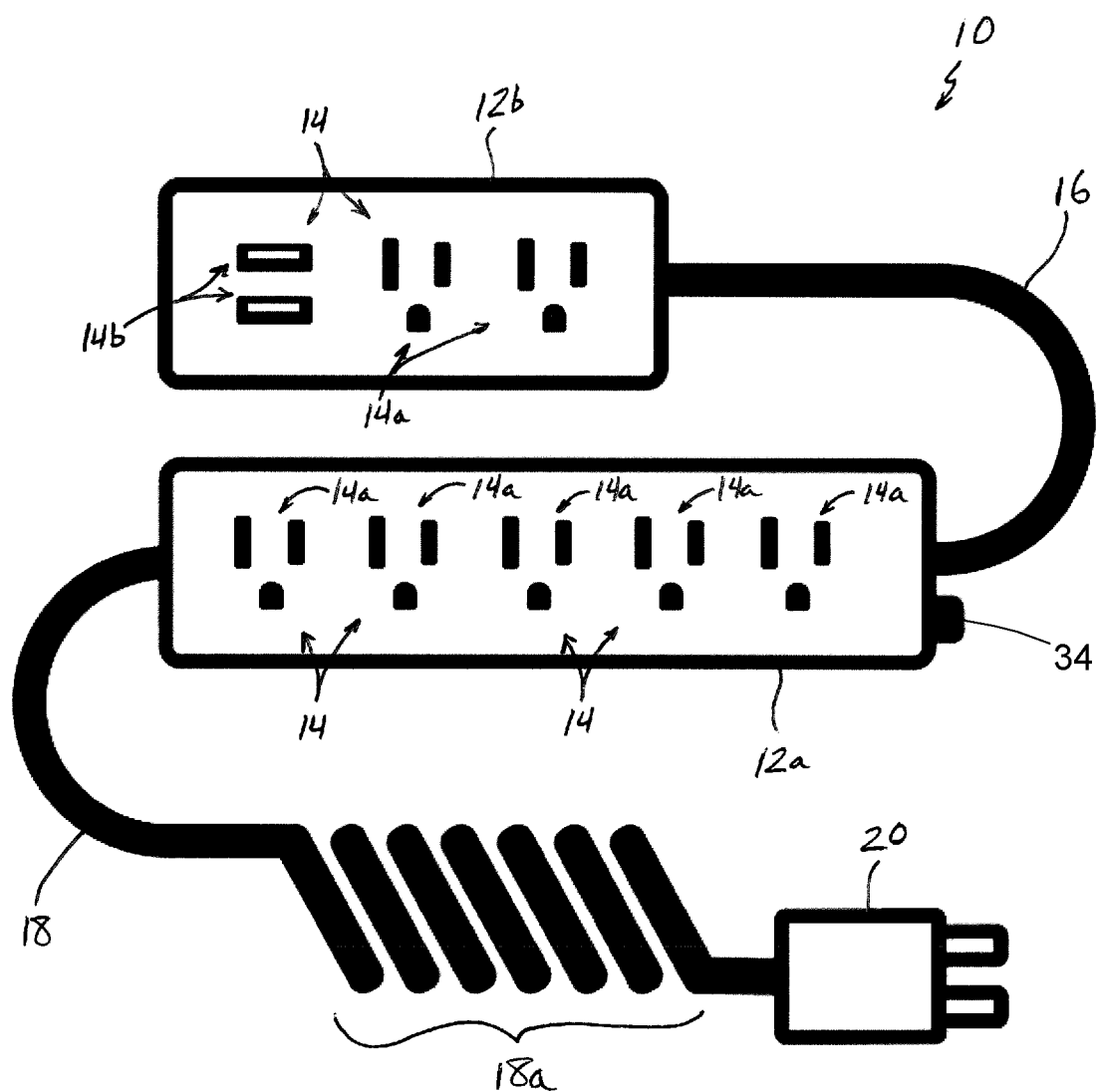
FIG. 1 is a front elevation of an electrical power distribution system in accordance with the present invention.

Referring now to the drawings and the illustrative embodiments depicted therein, an electrical power distribution system 10 is adapted for installation along furniture articles and/or for routing through work areas, to provide users with convenient access to first and second electrical power units 12a, 12b that are fitted with electrical outlets 14, such as high voltage AC power outlets 14a and low voltage DC power outlets 14b (FIG. 1). Electrical power units 12a, 12b are joined together by an intermediate power cord 16, and both units 12a, 12b are supplied with power received from a power supply cord 18 that extends from the first power unit 12a to a conventional plug 20 that is configured to engage a wall outlet, floor outlet, ceiling outlet, or other source of electrical power. The second electrical power unit 12b may contain an AC-to-DC electrical power converter for supplying low voltage DC power to the low voltage DC power outlets 14b, from high voltage AC power received from the intermediate power cord 16.

Optionally, and as shown in FIG. 1, the power supply cord 18 includes an elastic coiled portion 18a that allows the distance between plug 20 and first power unit 12a to be varied, while also taking up slack in the power supply cord 18 at the elastic coiled portion 18a. Optionally, a spring-actuated or power-actuated spool-type cord retractor may be substituted for the elastic coiled portion 18a. Thus, the electrical power distribution system 10 can be used to supply power to a first remote location with the first power unit 12a, which also serves as a pass-through, and also to a second remote location that is different from the first remote location using the second power unit 12b. It will be appreciated that, to provide additional power locations and flexibility for different applications or work environments, an elastic coiled portion may also be provided in the intermediate power cord 16, and that additional intermediate power cords and electrical power units may be provided downstream from the second electrical power unit 12b.

Optionally, two or more "second" power units 12b may branch off of the first power unit 12a via their own intermediate cords 16, in the same or different direction as one another. Typically, the intermediate cords 16 are permanently electrically and mechanically connected to the first power unit 12a, with provisions made in the housing of the first power unit 12a for the exit of different numbers of intermediate cords 16, as needed. For example, different housings may have different numbers of exit openings along any desired housing surface, or housings may be formed with "knockout windows" that can be removed to create additional openings. In the illustrated embodiment of FIG. 1, the first power unit 12a includes a circuit breaker 34 that may be configured to temporarily disconnect power to only the second power unit 12b if power draw at the second power unit 12b exceeds a predetermined threshold, or may be configured to temporarily disconnect power to the first and second power units 12a, 12b if overall power draw in the overall power distribution system 10 exceeds a predetermined threshold.

Figure 2:
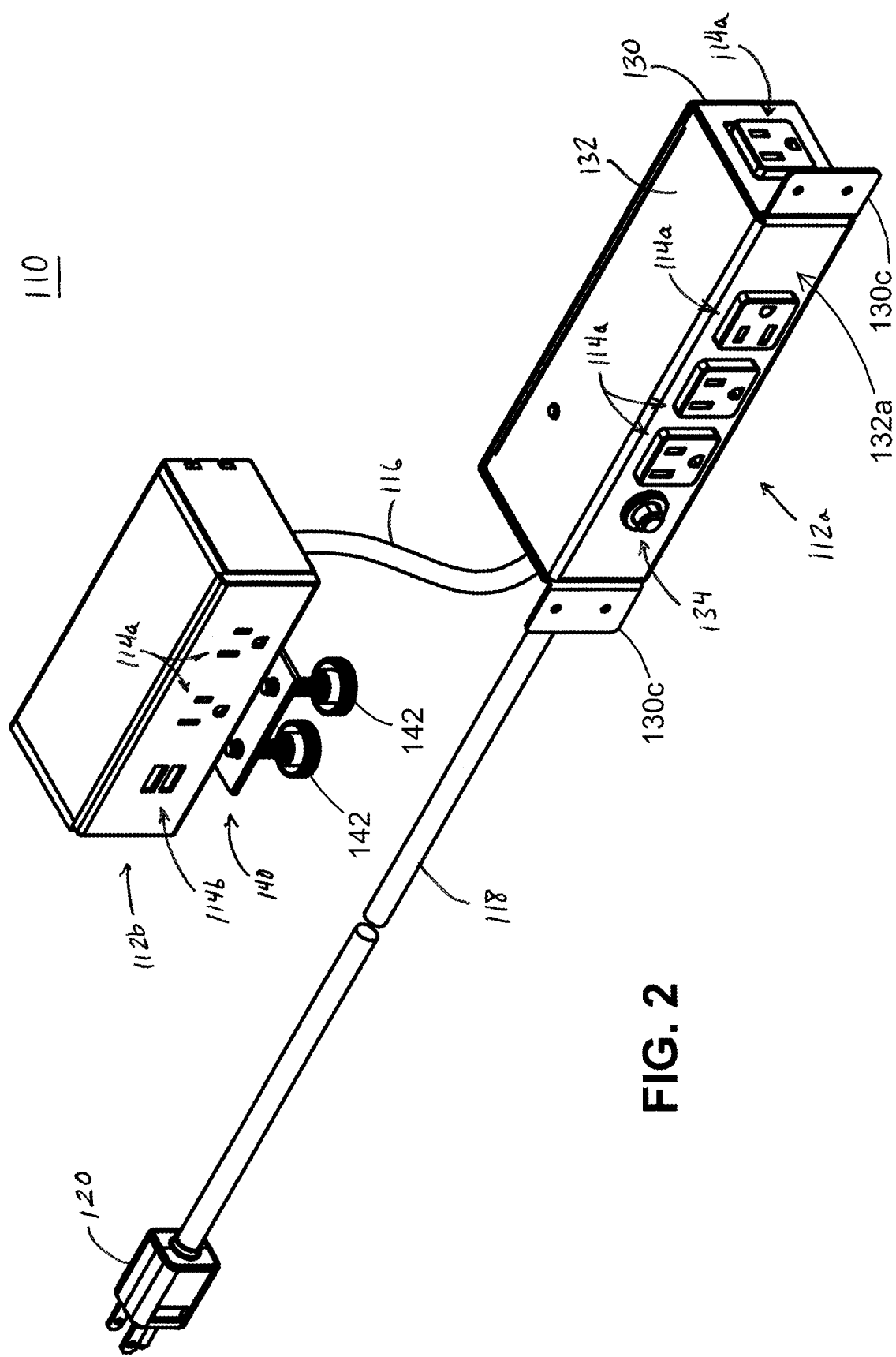
FIG. 2 is a perspective view of an electrical power distribution system similar to that of FIG. 1.
Figure 3:
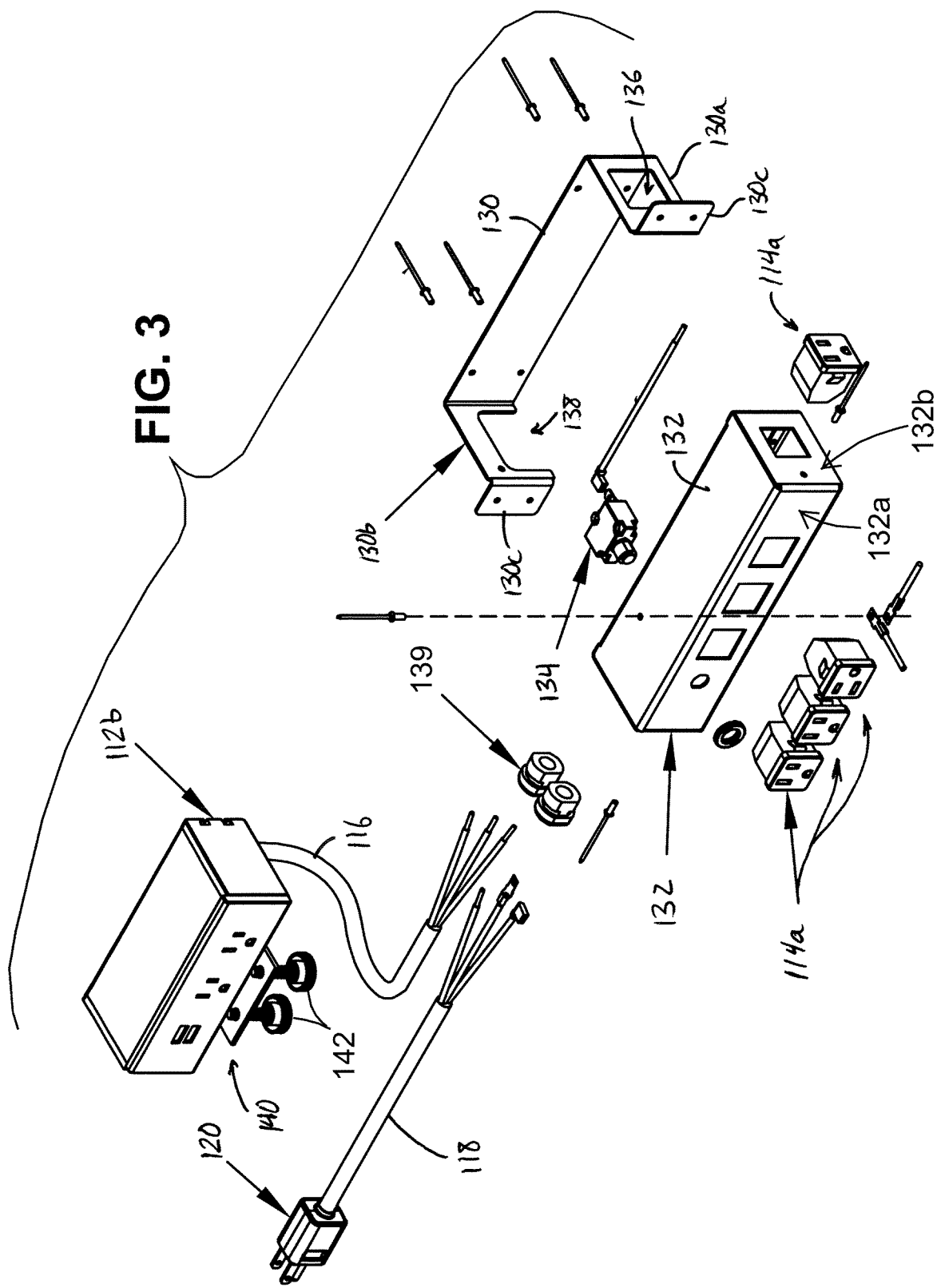
FIG. 3 is a partially exploded perspective view of the electrical power distribution system of FIG. 2.
Figure 4:
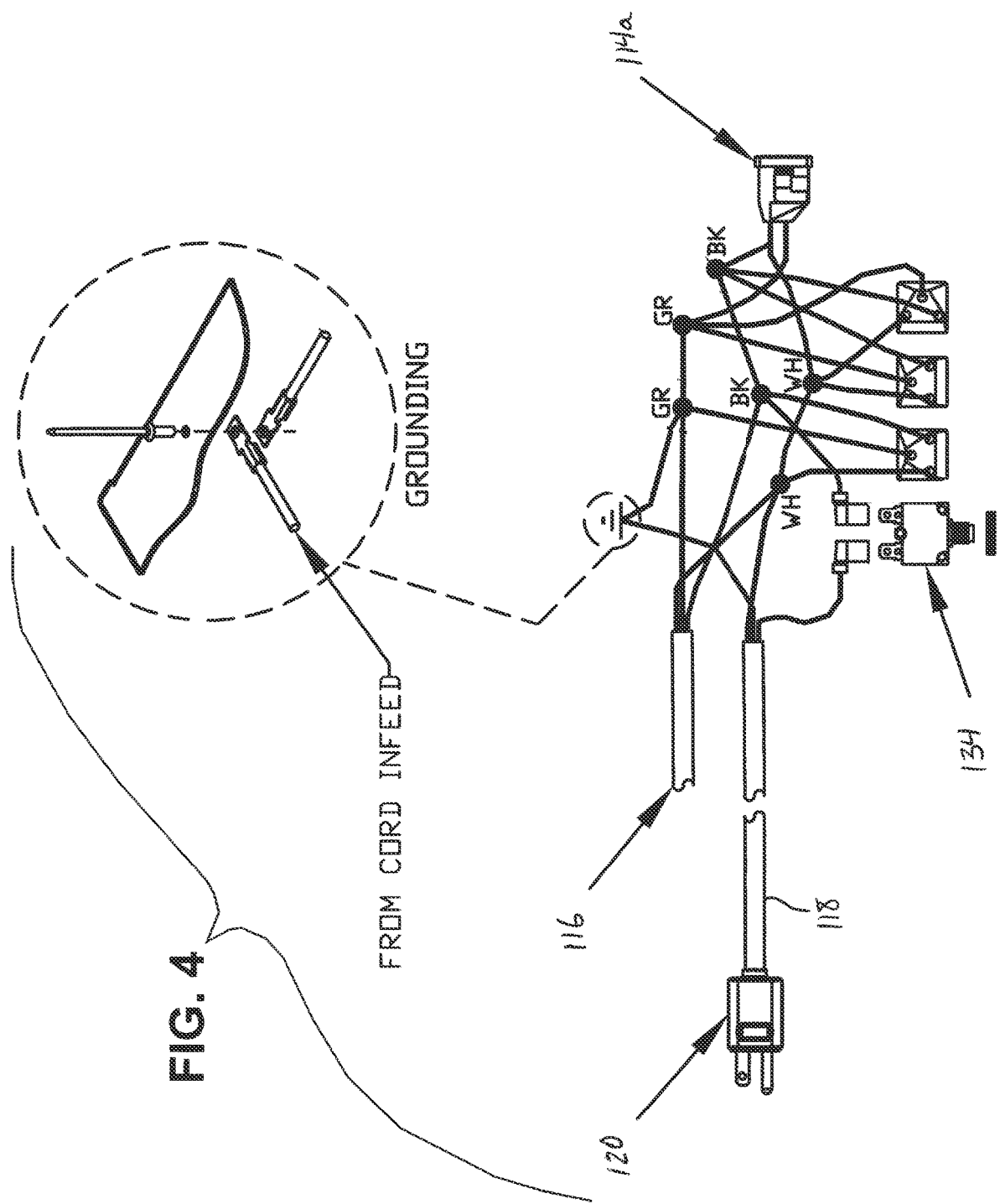
FIG. 4 is a wiring diagram depicting electrical connections of the electrical power distribution system of FIG. 2.

The first and second power units may be provided with various mounting options, as will be understood with reference to FIGS. 2 and 3 in which another electrical power distribution system 110 includes various components that contain like reference numerals to those of FIG. 1 with reference to the electrical power distribution system 10 described above, with the addition of 100. The first electrical power unit 112a, which also acts as a pass-through, is fitted with a generally U-shaped bracket 130 and includes three high voltage AC power outlets 114a and a circuit breaker 134 mounted along a first or front face 132a of its housing 132. The bracket 130 includes a first side leg 130a defining an outlet opening 136 to provide access to a side-mounted high voltage AC power outlet 114a that is mounted along a second or side face 132b of housing 132, and a second side leg 130b defining a recess or cutaway region 138 where a pair of wire grommets 139 (FIG. 3) pass through the housing 132 with respective ones of the intermediate power cord 116 and the power supply cord 118 routed through the grommets 139 to provide strain relief. U-shaped bracket 130 is suitable for rear-mounting or bottom-mounting the first electrical power unit to another surface, such as at an opening in an aesthetic panel or in a table or desk surface, and includes a pair of flanges 130c for that purpose. The second electrical power unit 112b is fitted with an edge-mount bracket 140 that includes a pair of thumbscrews 142 for tightening against the underside of a shelf, tabletop, desktop, or the like, to thereby secure the edge-mount bracket 140 with the second electrical power unit 112a. It will be appreciated that various other types of brackets may be used for the electrical power units without departing from the spirit and scope of the present invention. As with the power distribution system 10, and also the other power distribution systems described hereinbelow, additional "second" power units 112b with respective intermediate power cords 116 may be mechanically and electrically coupled to the first power unit 112a. For all embodiments disclosed herein, it is further envisioned that additional power units and power cords may be added in series and/or in branches, in substantially any desired combination.

Desired levels of tension may be maintained in each power cord 16, 18, 116, 118 that is equipped with an elastic coiled portion or similar self-retracting feature, according to the specific characteristics (elasticity, etc.) chosen for the self-retracting feature. The electrical power distribution systems 10, 110 may be well adapted for use with height-adjustable furniture, or on other furniture that may be repositioned within a particular zone or area of reach for the power units of the electrical power distribution system. Other variations include the provision of data signal wiring and connectors such as video and/or audio cables, fiber optic lines, and the like, in addition to electrical power wiring, or substituting for the electrical power wiring disclosed herein.

Optionally, electrical power distribution systems may provide access to electrical power and/or electronic data along a work surface, and also below the work surface. For example, electrical power distribution system 210 of FIG. 5 includes a power supply cord 218 with plug 220, the cord 218 feeding in to a first electrical power unit in the form of a three-outlet pass-through receptacle 212a. An intermediate power cord 216 receives power from the pass-through receptacle 212a as will be described below in more detail, and carries the power to a second electrical power unit 212b. In the illustrated embodiment of FIG. 5, the second power unit 212b is configured for mounting at or along a work surface such as a table, desk, countertop, or the like, and the pass-through receptacle 212a would typically lie along a floor surface below the work surface, or would be suspended by the intermediate power cord 216 between the work surface and the floor surface. For this and the other embodiments described herein, the strain reliefs permit the pass-through receptacle 212a to be suspended from the intermediate cord 216 without damage, and it will be appreciated that a grommet or other strain relief may be provided at the second electrical power unit 212b to ensure that the intermediate cord 216 cannot be pulled out during normal use. Features of the second power unit 212b may be understood with reference to the above descriptions for the second power unit 112b described above, and will not be repeated herein.

Figure 5:
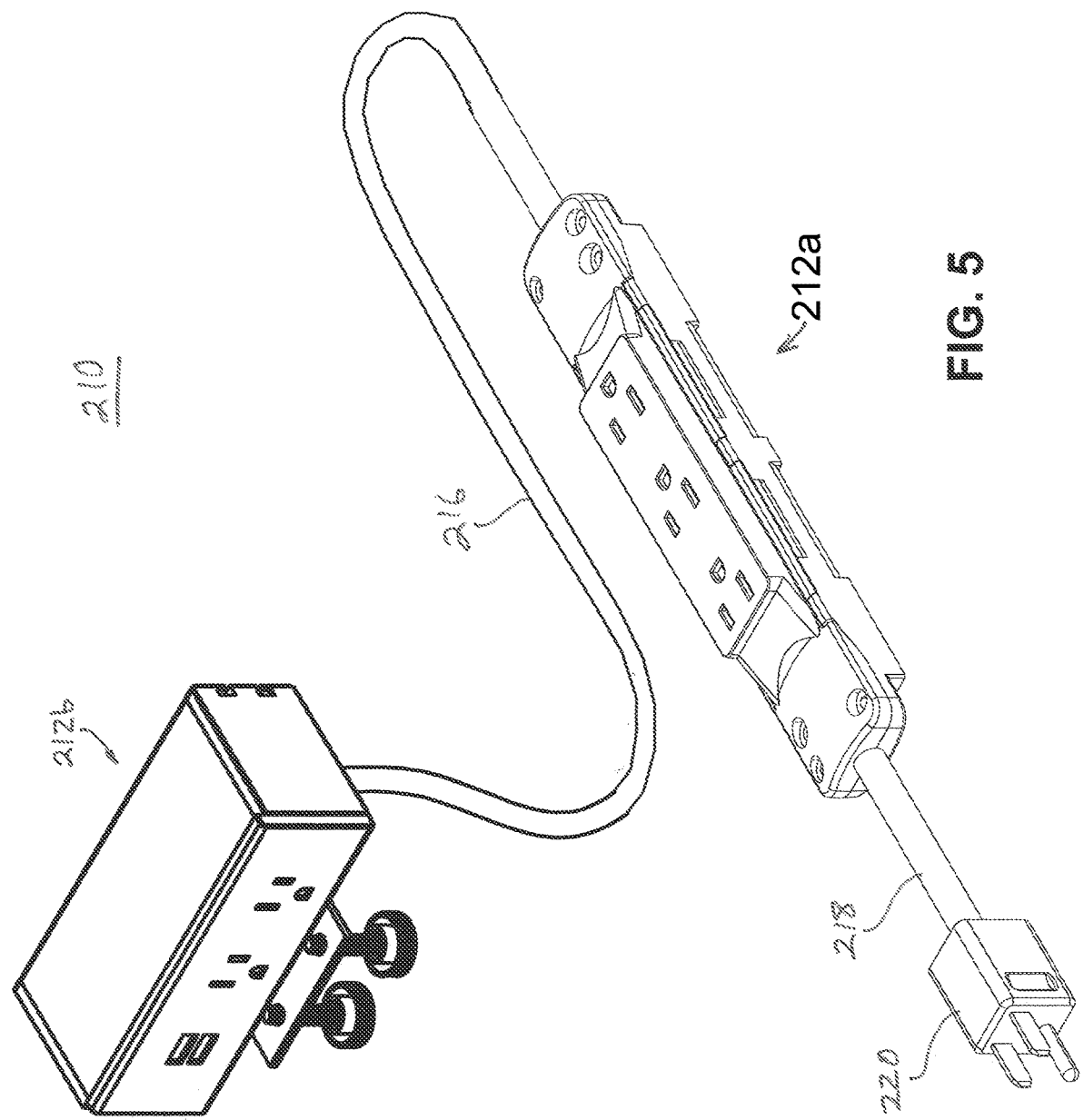
FIG. 5 is a perspective view of another electrical power distribution system in accordance with the present invention.
Figure 6:
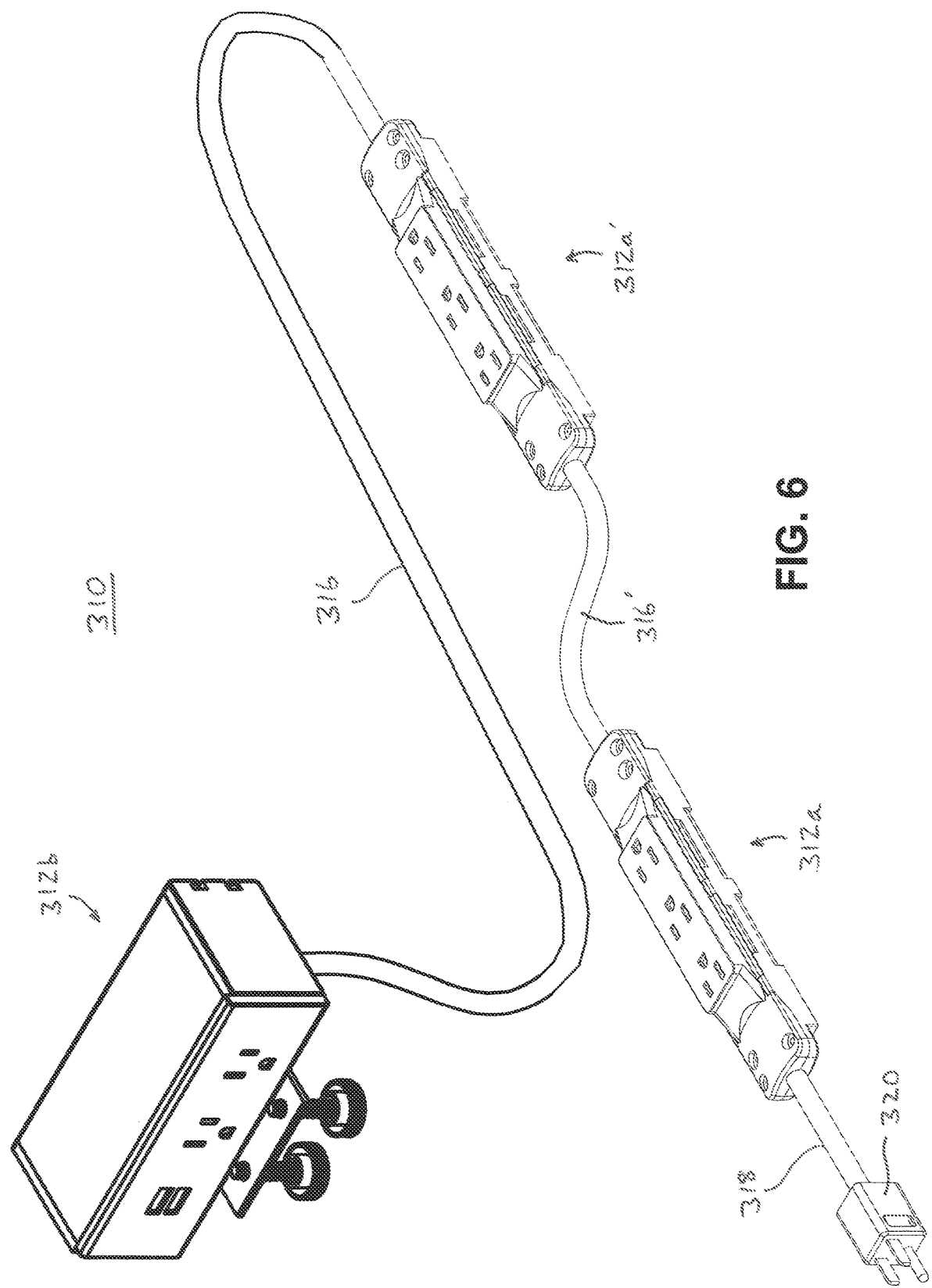
FIG. 6 is a perspective view of another electrical power distribution system in accordance with the present invention.

Optionally, and as shown in FIG. 6, another electrical power distribution system 310 may be substantially the same as the power distribution system 212 of FIG. 5, except for the addition of another pass-through receptacle 312a' in addition to a first pass-through receptacle 312a. 1An intermediate power cord 316 receives power from the additional pass-through receptacle 312a' to a second electrical power unit 312b. Another intermediate power cord 316' receives power from the first pass-through receptacle 312 and carries it so the additional pass-through receptacle 312a'. Optionally, the power supply cords and intermediate power cords of the electrical power distribution systems 110, 210, 310 may include self-retracting cord sections. It will further be appreciated that the various cord lengths, numbers and types of outlets, and numbers of pass-through receptacles and additional power units may be selected according to the needs of a particular work area. Other components of the electrical power distribution system 310 may be understood with reference to the above descriptions for the electrical power distribution system 210 described above and below, and will not be repeated herein.

Figure 7:
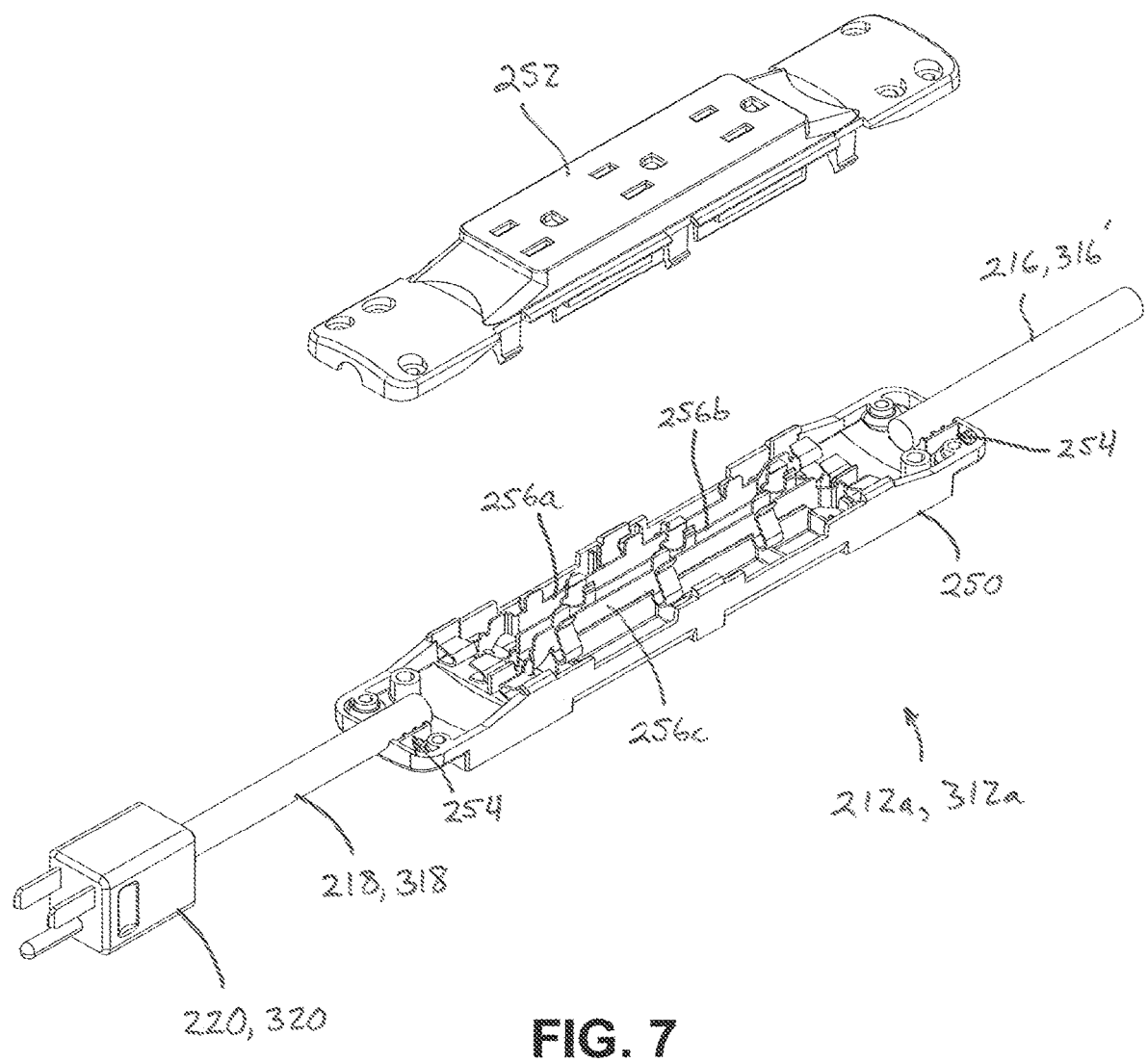
FIG. 7 is a perspective view of a three-outlet power input and pass-through of the electrical power distribution systems of FIGS. 5 and 6.
Figure 8:
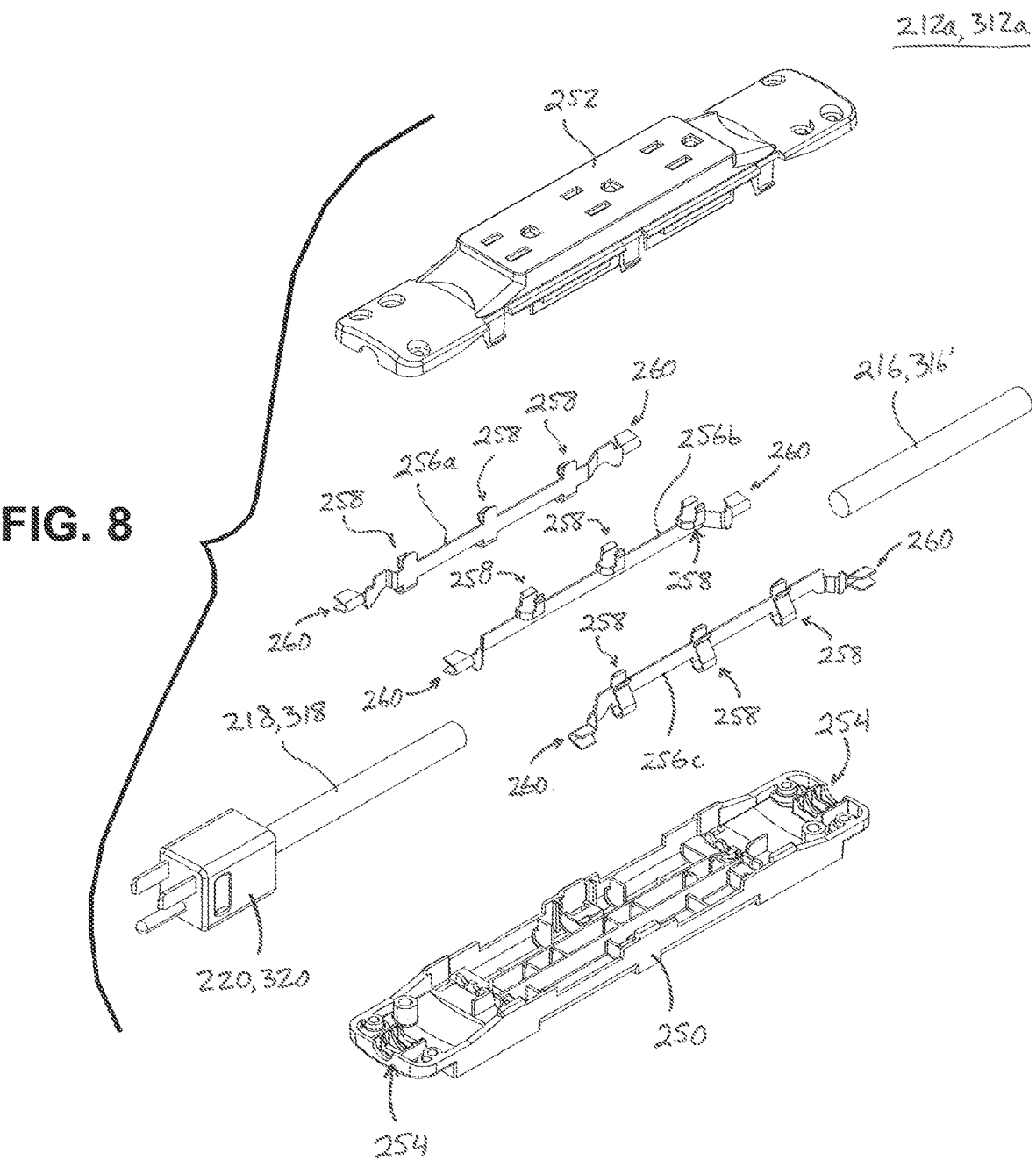
FIG. 8 is an exploded perspective view of the three-outlet power input and pass-through of FIG. 7.

The pass-through receptacles 212a, 312a, 312a' are substantially identical to one another, and their construction may be understood with reference to FIGS. 7 and 8. In the illustrated embodiment, the pass-through receptacle 212a includes a lower housing portion 250 and an upper housing portion 252 that secures to the lower housing portion 250 via resilient snap-fit connections and threaded fasteners (not shown) at each end. The housing portions 250, 252 include strain relief features 254 at each end, which engage and secure the power supply cord 218 and the intermediate power cord 216, respectively. A line bus bar 256a, a ground bus bar 256b, and a common or neutral bus bar 256c are mounted in respective receiving channels defined by the upper and lower housing portions 250, 252, such as shown in FIGS. 7 and 8. Each bus bar 256a-c includes three electrical contacts 258 for receiving respective prongs of a compatible electrical plug, and a crimp terminal 260 at each opposite end for engaging a corresponding electrical conductor (not shown) of the power supply cord 218 or the intermediate power cord 216. This arrangement and configuration of bus bars 256a-c permits electrical power and/or electronic signals to be carried through each pass-through receptacle and on to an additional electrical distribution component that is spaced apart from the pass-through receptacle, while providing access to the power or signals by a compatible device connector of the pass-through receptacle.

The electrical power distribution systems thus provide one or more users with access to outlets along the work surface, provided by a power unit that may be conveniently located for charging or powering a portable electronic device such as a phone, a tablet or laptop computer, or a small appliance that may be located on or near the work surface, and/or may provide a data connection such as for screen-sharing to a remotely located display screen. At the same time, the electrical power distribution systems provide the same or a different user with access to additional power and/or data outlets along a pass-through receptacle, which may be located in an out-of-the-way location and, thus, more appropriate for electrical or electronic devices that are plugged in and unplugged with less frequency, such as a lamp, a full-size desktop computer, a computer monitor, a printer, or a space heater.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:
1. An electrical power system comprising:
   a flexible electrical supply cord having an input end portion and an output end portion opposite said input end portion;
   a pass-through electrical outlet unit coupled to said output end portion of said flexible electrical supply cord, said pass-through electrical outlet unit comprising a first plurality of electrical outlets and configured for positioning below a work surface;
   a flexible intermediate electrical cord having an input end portion at said pass-through electrical outlet unit and an opposite output end portion;
   an end electrical outlet unit coupled to said opposite output end portion of said flexible intermediate electrical cord, said end electrical outlet unit comprising a second plurality of electrical outlets;
   a plurality of electrical bus bars extending through said pass-through electrical outlet unit, said plurality of electrical bus bars having respective opposite ends that are mechanically and electrically coupled to respective electrical conductors at said output end portion of said flexible electrical supply cord, and to respective electrical conductors at said input end portion of said flexible intermediate electrical cord;
   a circuit breaker mounted at said pass-through electrical outlet unit, said circuit breaker in electrical communication with both said first plurality of electrical outlets and said second plurality of electrical outlets; and
   a bracket coupled to said end electrical outlet unit and configured for coupling said end electrical outlet unit to the work surface;
   wherein said circuit breaker is configured to temporarily disconnect power to said first plurality of electrical outlets and said second plurality of electrical outlets in the event that total power draw in said electrical power system exceeds a predetermined threshold.
2. The electrical power system of claim 1, wherein said pass-through electrical outlet unit is configured to rest upon a floor surface below the work surface.
3. The electrical power system of claim 1, wherein said pass-through electrical outlet unit comprises a cord-engaging strain relief that permits said pass-through electrical outlet unit to be suspended below the work surface by said flexible intermediate electrical cord.
4. The electrical power system of claim 1, wherein said pass-through electrical outlet unit comprises a first strain relief for engaging said output end portion of said flexible electrical supply cord, and a second strain relief for engaging said input end portion of said flexible intermediate electrical cord, and wherein said first strain relief and said second strain relief are positioned adjacent one another in side-by-side arrangement along one housing panel of said pass-through electrical outlet unit.
5. The electrical power system of claim 1, wherein:
   said first plurality of electrical outlets comprise a pair of high voltage AC power outlets positioned adjacent one another in side-by-side arrangement along one housing panel of said pass-through electrical outlet unit, wherein one of said pair of high voltage AC power outlets is rotated 90 degrees relative to the other of said pair of high voltage AC power outlets; and said second plurality of electrical outlets comprise at least one low voltage DC power outlet.

6. The electrical power system of claim 1, wherein at least one of said flexible electrical supply cord and said flexible intermediate electrical cord comprises a self-retracting cord section.

7. The electrical power system of claim 1, wherein at least one of said pass-through electrical outlet unit and said end electrical outlet unit comprises both a high voltage AC power outlet and a low voltage DC power outlet.

8. The electrical power system of claim 1, wherein said input end portion of said flexible electrical supply cord comprises at least one chosen from (i) a high voltage AC power plug, and (ii) a low voltage DC power plug.

9. The electrical power system of claim 1, wherein said pass-through electrical outlet unit comprises a first surface supporting one of said first plurality of electrical outlets and a second surface supporting another of said first plurality of electrical outlets, wherein said first surface is angled ninety degrees relative to said second surface.

10. An electrical power or data system comprising:
a flexible electrical supply cord having an input end portion and an output end portion opposite said input end portion;
a pass-through electrical outlet unit coupled to said output end portion of said flexible electrical supply cord, said pass-through electrical outlet unit comprising a first plurality of electrical outlets and configured for positioning below a work surface;
a flexible intermediate electrical cord having an input end portion at said pass-through electrical outlet unit and an opposite output end portion;
an end electrical outlet unit coupled to said opposite output end portion of said flexible intermediate electrical cord, said end electrical outlet unit comprising a second plurality of electrical outlets;
a plurality of electrical bus bars extending through said pass-through electrical outlet unit, said plurality of electrical bus bars having respective opposite ends that are mechanically and electrically coupled to respective electrical conductors at said output end portion of said flexible electrical supply cord, and to respective electrical conductors at said input end portion of said flexible intermediate electrical cord;
a first strain relief for engaging said output end portion of said flexible electrical supply cord;
a second strain relief for engaging said input end portion of said flexible intermediate electrical cord; and
a bracket configured for coupling said end electrical outlet unit to the work surface.

11. The electrical power or data system of claim 10, wherein said pass-through electrical outlet unit or said end electrical outlet unit comprises both a high voltage AC power outlet and a low voltage DC power outlet.

12. The electrical power or data system of claim 10, wherein said flexible electrical supply cord and said flexible intermediate electrical cord both comprise a high voltage AC power cords.

13. The electrical power or data system of claim 10, wherein said first plurality of electrical outlets comprise a pair of high voltage AC power outlets positioned adjacent one another in side-by-side arrangement along one housing panel of said pass-through electrical outlet unit, wherein one of said pair of high voltage AC power outlets is rotated 90 degrees relative to the other of said pair of high voltage AC power outlets.

14. The electrical power or data system of claim 13, wherein said second plurality of electrical outlets comprise at least one low voltage DC power outlet.

15. The electrical power or data system of claim 14, further comprising a circuit breaker mounted at said pass-through electrical outlet unit, said circuit breaker in electrical communication with both said first plurality of electrical outlets and said second plurality of electrical outlets, wherein said circuit breaker is configured to temporarily disconnect power to said first plurality of electrical outlets and said second plurality of electrical outlets in the event that total power draw in said electrical power or data system exceeds a predetermined threshold.

16. An electrical power system comprising:
a flexible electrical supply cord having an input end portion and an output end portion opposite said input end portion;
a pass-through electrical outlet unit coupled to said output end portion of said flexible electrical supply cord, said pass-through electrical outlet unit comprising a first plurality of electrical outlets and configured for positioning below a work surface;
a flexible intermediate electrical cord having an input end portion at said pass-through electrical outlet unit and an opposite output end portion;
an end electrical outlet unit coupled to said opposite output end portion of said flexible intermediate electrical cord, said end electrical outlet unit comprising a second plurality of electrical outlets including at least one high voltage AC power outlet and at least one low voltage DC power outlet;
a plurality of electrical bus bars extending through said pass-through electrical outlet unit, said plurality of electrical bus bars having respective opposite ends that are mechanically and electrically coupled to respective electrical conductors at said output end portion of said flexible electrical supply cord, and to respective electrical conductors at said input end portion of said flexible intermediate electrical cord, wherein said plurality of electrical bus bars each comprise electrical contacts associated with said first plurality of electrical outlets; and
a circuit breaker mounted at said pass-through electrical outlet unit, said circuit breaker in electrical communication with both said first plurality of electrical outlets and said second plurality of electrical outlets;
wherein said first plurality of electrical outlets comprise a pair of high voltage AC power outlets positioned adjacent one another in side-by-side arrangement along a first housing panel of said pass-through electrical outlet unit, and wherein one of said pair of high voltage AC power outlets is rotated 90 degrees relative to the other of said pair of high voltage AC power outlets.

17. The electrical power system of claim 16, wherein said circuit breaker is configured to temporarily disconnect power to said first plurality of electrical outlets and said second plurality of electrical outlets in the event that total power draw in said electrical power or data system exceeds a predetermined threshold.

18. The electrical power system of claim 17, further comprising:
a first strain relief for engaging said output end portion of said flexible electrical supply cord; and
a second strain relief for engaging said input end portion of said flexible intermediate electrical cord;
wherein said first strain relief and said second strain relief are positioned adjacent one another in side-by-side arrangement along a second housing panel of said pass-through electrical outlet unit.

19. The electrical power system of claim 18, further comprising:
- a third housing panel angled ninety degrees relative to said first housing panel and positioned opposite said second housing panel;
- another high voltage AC power outlet mounted at an opening in said third housing panel;
- a pass-through bracket coupled to said pass-through electrical outlet unit, said pass-through bracket configured for coupling said pass-through electrical outlet unit to the work surface; and
- a bracket coupled to said end electrical outlet unit and configured for coupling said end electrical outlet unit to the work surface.

* * * * *